United States Patent Office 2,945,793
Patented July 19, 1960

2,945,793
PROCESS FOR COLORING DIAMONDS

Ronald Arthur Dugdale, Harwell, England, assignor to the United States of America as represented by the United States Atomic Energy Commission No Drawing. Continuation of application Ser. No. 340,137, Mar. 3, 1953. This application Apr. 28, 1958, Ser. No. 732,775

2 Claims. (Cl. 204—154)

This invention relates to diamonds and is concerned with a process for colouring diamonds.

This application is a continuation of my copending application, Serial No. 340,137, filed March 3, 1953, now abandoned.

The majority of diamonds, in their natural state, have at least some colour, while in many it is quite marked. Apart from grey stones (which are most common and for which the colour is attributed to small inclusions near the surface), yellow, olive green or yellow green, and brown seem to be the most common. The origin of these colours is not clear. It is not even clear whether the colour is generally confined to the surfaces, or distributed through the body of the stones. Certainly, in some cases (yellows and yellow greens), the colour may become paler on polishing and can often be removed by grinding and therefore appears to be connected with the surface. In such cases the colour has been attributed to the effect of natural radioactivity. There is little evidence for the colouring of diamonds by impurities.

The change in colour of diamond induced by radium radiation was noticed at the beginning of the century by Sir William Crookes and others. These early reports are not very consistent, probably because the irradiations were weak and the colour changes slight. However, it was established in 1923 by Lind and Bardwell (Amer. Min. 8, 171, 1923) that diamonds are coloured green by the alpha particles from radium. Prolonged heating at 500° C. is said to have restored the original colour.

There have been several reports, in the last decade, of diamonds coloured by proton, deuteron, and alpha particle bombardment. Various colours from light green to dark brown, depending on the length of exposure and the intensity of the beam, were obtained. It seems probable that the brown colours were due to a combination of heating and bombardment.

Random irradiation of diamonds in an atomic pile shows that a green colour is induced which deepens as the irradiation proceeds until the diamonds actually become opaque. The time required to reach the opaque stage depends of course on the thickness of the diamond, but, for diamonds about 2 mm. thick, is about one week in a graphite moderated pile operated with a thermal neutron flux of $10^{12}/cm.^2/sec.$ Any fluorescence and phosphorescence the diamonds may have (excited by $\lambda$ 3650) is rapidly extinguished, being quite unnoticeable after a week's irradiation. In general, induced radioactivity is weak and of short half lives of the order of ten hours. A week after irradiation it was not usually detectable with an ordinary Geiger counter.

Heating at temperatures up to about 600° C. reduced the intensity of the green colour, the higher temperatures up to this figure being the more effective (a temperature of 500° C. caused a 1200 hour irradiation opaque diamond to transmit in the green). At 650° C. the colour changed rather abruptly to a brown shade which was only slightly altered by temperatures up to 1000° C. The ultimate colour after heating at this temperature ranged from pale yellow, brown, or brown-green for the 10 hour irradiations to brown-red, brown, or brown-green for the 1200 hour irradiations. Using a simple spectrometer it was possible to see the absorption at the blue end of the spectrum (which was strong after only 10 hours irradiation) decreasing as the temperature was raised. In addition to the colour change various absorption lines and bands appeared and disappeared.

The evidence suggests that diamonds are coloured only by particles of sufficient energy to displace atoms from their normal lattice sites into interstitial sites, and that the colour centres are connected with these vacant lattice sites and interstitial atoms.

According to F. Seitz (Crystal Growth. A General Discussion of the Faraday Society. 1949, p. 271) about 25 ev. recoil energy is needed for a carbon atom in diamond to be displaced, by bombardment, from its normal lattice site to an interstitial site.

Defects in a lattice structure caused by such displacement of atoms are known as Frenkel defects and will hereinafter be referred to as such. They may occur singly in which case the displacement from the vacant site is probably small or in groups when the displacement may be greater.

An object of the present invention is to provide a method of manufacturing blue and blue-green gemstones from substantially colourless and less valuable diamonds.

According to the present invention a process for colouring in the range blue to blue-green a substantially colorless diamond comprises the step of subjecting said diamond to radiations of an energy within a range selected to produce mainly single Frenkel defects in the diamond lattice.

Blue colouration is believed to be due to single Frenkel defects and green colouration to groups of Frenkel defects.

Also in accordance with the invention, a diamond coloured blue-green by the above process is reduced to a pure blue colour by subsequent heat treatment.

Electron bombardments are able to introduce appreciable numbers of Frenkel defects; for the maximum recoil energy $Wm$ which may be given to a nucleus in an elastic collision is, very approximately:

$$Wm = 2E(E+2m_0c^2)/Mc^2 \qquad (1)$$

where E is the electron energy and $m_0c^2$ and $Mc^2$ are the rest energies of electron and nucleus respectively. Also, the cross section for the recoil energy to lie between a value W and $Wm$ denoted by $\sigma_W^{Wm}$ is approximately:

$$\sigma_W^{Wm} = 2.5 \cdot 10^{-25} Z^2 \left(\frac{1-\beta^2}{\beta^4}\right) \left(\frac{Wm}{W} - 1 - \beta^2 \log \frac{Wm}{W}\right) \qquad (2)$$

where z is the nuclear charge and $\beta = v./c.$ (This formula was obtained from the differential scattering cross-section given by Mott and Massey, The Theory of Atomic Collisions. 2nd edition, Oxford, 1949, p. 80). The values of $Wm$ and $\sigma_{25}^{Wm}$ for three electron energies 3, 1 and 0.5 mev. as derived from the above expression are listed in the following table:

| E (mev.) | 3 | 1 | 0.5 |
|---|---|---|---|
| $Wm$ (ev.) | 2,150 | 360 | 140 |
| $\sigma_{25}^{Wm}$ (barns) | 15 | 14 | 13 |

Thus, for an integrated flux of $2 \times 10^{18}$ electrons/cm.$^2$ at least within the range 0.5 to 3 mev., the concentration of primary displaced atoms, at the surface upon which the beam was incident, would be about $3 \times 10^{-5}$. This would fall off as the beam penetrated due to the decrease, firstly, in flux and secondly, in energy. Due to the form of the dependence of $\sigma_W^{Wm}$ on W one would expect that the majority of the primary displaced atoms would have received recoil energies very much less than $Wm$. The electron bombardment, therefore, is believed to produce mainly single Frenkel defects, although an appreciable multiplication—leading to secondary displaced atoms, might occur at electron energies above about 3 mev.

On the basis that 25 ev. is needed for an atom to be displaced, the threshold recoil energy for colouring by electron bombardment would be 125 kev. as calculated from expression (1) above.

A practical energy range for electron bombardment to produce blue to blue-green colouration is from about 0.5 mev. to about 2 mev. Below 1 mev. pure blue is obtained. At about 1 mev. and above the colour tends to blue-green which may be reduced to a pure blue by heat treatment for half an hour at a temperature in the region of 500° C.

In one practical example of the invention a number of small colourless diamonds were mounted in Woods metal on a water cooled pipe and subjected to bombardment by electrons from a Van der Graaf machine at an energy of 1 mev. for about an hour giving an integrated electron flux of between 1 and $2 \times 10^{18}$ electrons/cm.². The diamonds assumed a blue colour with a slight green tint, the penetration of the colour being about 0.5 mm. The diamonds were then heated at 500° C. for half an hour when they became a pure blue.

In an atomic pile, neutrons of all energies up to 1 or 2 mev. are present and can give the atoms of a crystal lattice recoil energies up to:

$$Wm = 4ME/(M+1)^2$$

where E is the neutron energy and M is the atomic mass in mass units. The average is just half this and the cross section for the collisions is about 3 barns. In general, the recoiling atom will have sufficient energy to produce, in turn, further displacements. Thus, one fast neutron collision will give rise to many Frenkel defects conglomerated in a small volume of the lattice (this topic is discussed by Seitz in the paper referred to). It has been estimated, on the basis of Seitz's theory, that 0.001% of the atoms in diamond became Frenkel defects in a 10 hour irradiation in a graphite moderated pile operated with a thermal neutron flux of $10^{12}$ sq./cm./sec.

A practical energy range for neutron bombardment to produce blue colouration or blue-green colouration capable of subsequent reduction to a pure blue colour by heat treatment is from 100 to 1000 ev., a range which may be obtained just outside the uranium core in the moderator of a thermal neutron atomic pile. An integrated flux of from about $10^{18}$ to $10^{19}$ neutrons per cm.² inversely as the size of the diamond is required. The contribution to this effect by gamma radiation from an atomic pile would be negligible.

The invention may also be carried out by means of gamma rays. The effect of such rays is to produce electrons by Compton scattering and the electrons in turn produce Frenkel defects by elastic collisions with the nuclei. Gamma ray energies of about 1 mev. and above with an integrated flux of about $10^{20}$ gamma rays/cm.² are required. Several years' irradiation would, however, be required to obtain this flux from known gamma ray sources such as Cobalt 60 or a Van der Graaf machine with a suitable target.

What is claimed is:

1. The process of coloring substantially colorless diamonds comprised of the steps of subjecting the colorless diamonds to irradiation by electrons having an energy of 1 mev. for approximately 1 hour giving an integrated electron flux of between 1 and $2 \times 10^{18}$ electrons/cm.², whereby the diamonds take on a blue color with a slight green tint, and then heating the irradiated diamonds at 500° C. for half an hour whereby they become pure blue.

2. A process for coloring a substantially colorless diamond in the range blue to blue-green comprising irradiating said colorless diamond with electrons having an energy within the range 0.5 mev. to 2 mev. to obtain an integrated electron flux of between 1 and $2 \times 10^{18}$ electrons/cm.².

References Cited in the file of this patent

FOREIGN PATENTS 660,719     Great Britain _____ Nov. 14, 1951

OTHER REFERENCES

Lind et al.: "Amer. Mining," vol. 8, p. 171 (1923).
Pringsheim et al.: "Z. Phys.," vol. 133, p. 2 (1952).
Seitz: "Advances in Physics," vol. 1, p. 43 (1952).